(12) United States Patent
Hsu

(10) Patent No.: US 9,182,936 B2
(45) Date of Patent: Nov. 10, 2015

(54) DISPLAY DEVICE WITH SHARABLE SCREEN IMAGE

(71) Applicant: Chia-Hao Hsu, Taipei (TW)

(72) Inventor: Chia-Hao Hsu, Taipei (TW)

(*) Notice: Subject to any disclaimer, the term of this patent is extended or adjusted under 35 U.S.C. 154(b) by 260 days.

(21) Appl. No.: 13/852,266

(22) Filed: Mar. 28, 2013

(65) Prior Publication Data
US 2013/0278482 A1  Oct. 24, 2013

(30) Foreign Application Priority Data
Apr. 18, 2012 (TW) .............................. 101113781 A

(51) Int. Cl.
*G09G 5/00* (2006.01)
*G06F 3/14* (2006.01)
*G06F 3/041* (2006.01)

(52) U.S. Cl.
CPC .............. *G06F 3/1423* (2013.01); *G06F 3/041* (2013.01); *G06F 3/1454* (2013.01); *G09G 2340/0407* (2013.01); *G09G 2356/00* (2013.01); *G09G 2370/025* (2013.01); *G09G 2370/16* (2013.01)

(58) Field of Classification Search
CPC ........... G09G 2300/026; G09G 23/026; G06F 3/1446; G02F 1/13336
USPC ..................... 345/1.1–1.3; 715/729–730, 734
See application file for complete search history.

(56) References Cited

U.S. PATENT DOCUMENTS

| | | | | |
|---|---|---|---|---|
| 8,334,817 | B2* | 12/2012 | Fujimori | 345/1.1 |
| 2006/0033712 | A1* | 2/2006 | Baudisch et al. | 345/157 |
| 2006/0284785 | A1* | 12/2006 | Bitterlich | 345/1.1 |
| 2007/0035471 | A1* | 2/2007 | Lee et al. | 345/1.1 |
| 2008/0148184 | A1* | 6/2008 | Davis | 715/810 |
| 2008/0218432 | A1* | 9/2008 | Ota | 345/1.3 |
| 2011/0148739 | A1* | 6/2011 | Nurmi | 345/1.3 |
| 2013/0214995 | A1* | 8/2013 | Lewin et al. | 345/1.3 |

* cited by examiner

*Primary Examiner* — Kimnhung Nguyen
(74) *Attorney, Agent, or Firm* — Kolisch Hartwell, P.C.

(57) ABSTRACT

Disclosed is an interaction mobile displaying device for jointly displaying one virtual screen image with other interaction mobile displaying devices, comprising display means for displaying a physical screen image corresponding to a portion of the virtual screen image; computing means for executing computations of the interaction mobile displaying device; and communication means for communicating with other interaction mobile displaying devices, so that those interaction mobile displaying devices are capable of interacting with each other via the virtual screen image.

10 Claims, 10 Drawing Sheets

DISPLAY DEVICE WITH SHARABLE SCREEN IMAGE

CROSS-REFERENCE TO RELATED APPLICATION

This application claims priority to Taiwanese Patent Application No. 101113781, filed Apr. 18, 2012, which is hereby incorporated by reference.

FIELD OF THE INVENTION

The present invention relates to an intelligent interaction mobile displaying device, and more particularly to an interaction mobile displaying device capable of jointly displaying one virtual screen image with other interaction mobile displaying devices.

BACKGROUND OF THE INVENTION

Intelligent interaction mobile displaying devices, including device from large size of notebook computers and tablet computers to small size of personal digital assistants and cell phones, and the like, can provide instant services via their display screens for users. They thus play more and more important role in the modern life for people.

In addition to providing the intelligent interaction mobile displaying device as a general interaction mobile displaying device, the intelligent interaction mobile displaying device could be operated as an interactive interaction mobile displaying device that allows the users to instinctively operate the interaction mobile displaying device in correspondence to the visual view feeding back from the different requests of the users. It thus the users could fully enjoy the service and function provided by the intelligent interaction mobile displaying device.

SUMMARY OF THE INVENTION

However, with the improvement of communication transmission technology, the demand of interaction between/among the intelligent interaction mobile displaying devices is increasing. The conventional interaction mobile displaying device which could only display the content in a single interaction mobile displaying device does not serve the need any more.

Therefore, it is an object of the present invention to provide an interaction mobile displaying device capable of interacting with other interaction mobile displaying devices via one virtual screen image.

The present invention overcomes the drawbacks of the prior art, and provides an interaction mobile displaying device for sharing one virtual screen image with other interaction mobile displaying devices, wherein the interaction mobile displaying device and other interaction mobile displaying devices are joined as an interaction mobile displaying device group, in which one of the interaction mobile displaying devices in the interaction mobile displaying device group is selected as a master displaying device and each one of all other interaction mobile displaying devices in the interaction mobile displaying device group is selected as a slave displaying device, the interaction mobile displaying device comprising: display means for displaying a physical screen image corresponding to a portion of the virtual screen image, wherein the virtual screen image is sourced from one of the interaction mobile displaying devices in the interaction mobile displaying device group; computing means, connected with the display means, for executing computations of the join of the interaction mobile displaying device and/or the join of the other interaction mobile displaying devices in the interaction mobile displaying device group so as to obtain the portion of the virtual screen image; and communication means, connected with the computing means, for communicating the interaction between/among the interaction mobile displaying device and the other interaction mobile displaying devices in the interaction mobile displaying device group so as to display the portion of the virtual screen image.

In an embodiment of the present invention, the communication means is communicated with other interaction mobile displaying devices by a wireless transmission method.

In an embodiment of the present invention, the communication means is communicated with other interaction mobile displaying devices via a physical transmission line.

In an embodiment of the present invention, the communication means is communicated with other interaction mobile displaying devices through a network.

In an embodiment of the present invention, the virtual screen image is sourced from the physical screen image selected from one of the interaction mobile displaying device and other interaction mobile displaying devices.

In an embodiment of the present invention, the virtual screen image is obtained by resizing the physical screen image.

In an embodiment of the present invention, the virtual screen image is obtained by changing the image resolution of the physical screen image.

In an embodiment of the present invention, the portion of the virtual screen image corresponding to the physical screen image is associated with the position of the interaction mobile displaying device in relation to all of the interaction mobile displaying devices sharing the virtual screen image.

In an embodiment of the present invention, the physical screen image of the interaction mobile displaying device is data transmittable to the physical screen image of other interaction mobile displaying devices through the virtual screen image.

In an embodiment of the present invention, the interaction mobile displaying device further comprises determining means, connected with the computing means, for determining whether sharing the virtual screen image with other interaction mobile displaying devices.

Thereby, the interaction mobile displaying device of the present invention is capable of communicating with other interaction mobile displaying devices to share one virtual screen image with each other. Thus, with the join of more interaction mobile displaying devices in communication, the physical dimension of available screen image is increased. It thus makes the number and dimension of screens larger. It benefits to provide a better service and utilization for sharing interaction mobile displaying devices.

Further, the virtual screen image can be served as a platform for communication and transmission. It therefore allows physical screen image of the interaction mobile displaying devices to interact with each other. While the conventional interaction implemented by software is limited by the software itself, the interaction implemented through the virtual screen image can fully achieve the function of the interaction mobile displaying device without any consideration of the software.

BRIEF DESCRIPTION OF THE DRAWINGS

The structure and the technical means adopted by the present invention to achieve the above and other objects can be best understood by referring to the following detailed description of the preferred embodiments and the accompanying drawings.

DETAILED DESCRIPTION OF THE PREFERRED EMBODIMENTS

Figure 1:
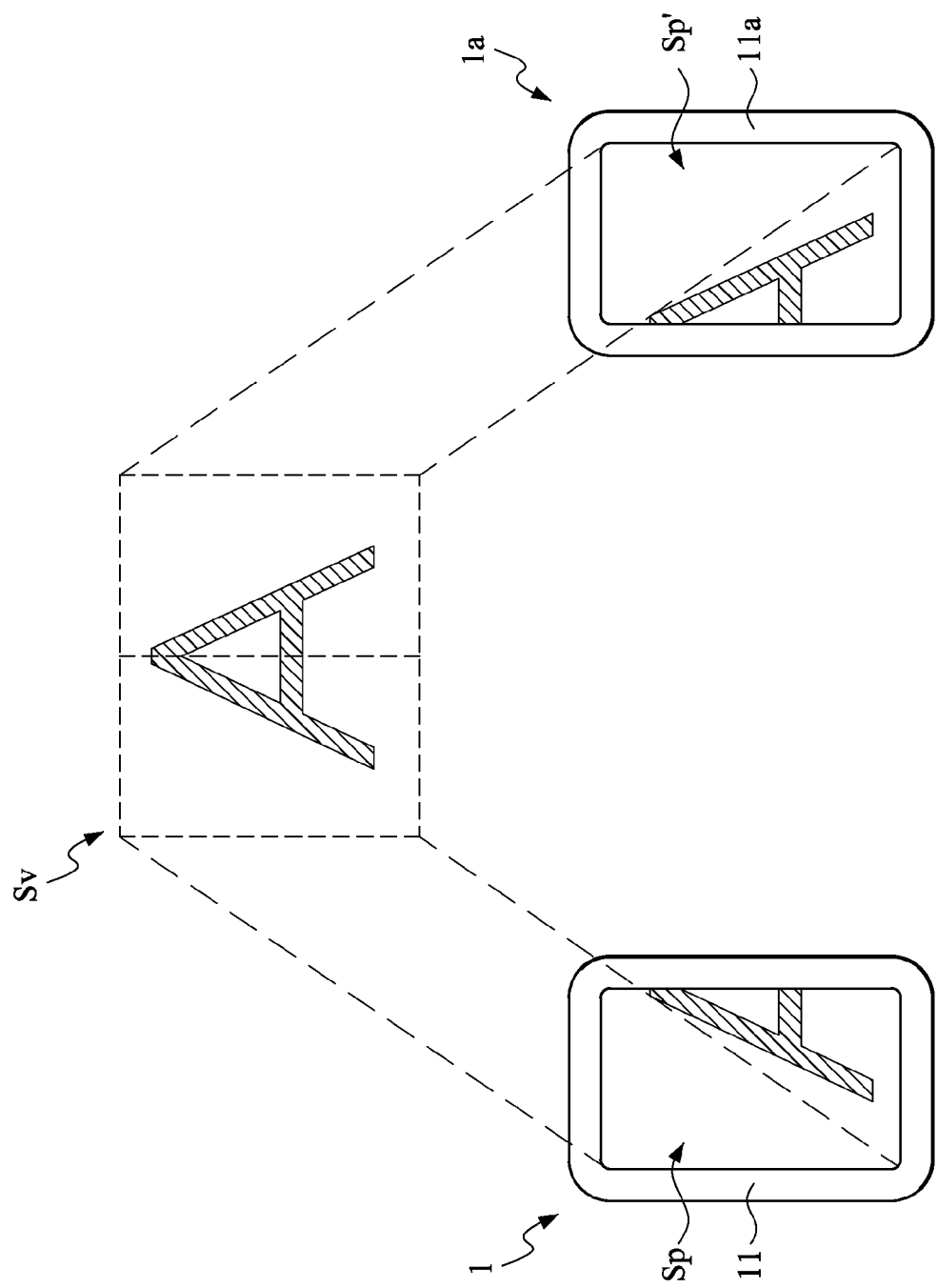
FIG. 1 is a schematic drawing of interaction mobile displaying devices according to an embodiment of the present invention.
Figure 2:
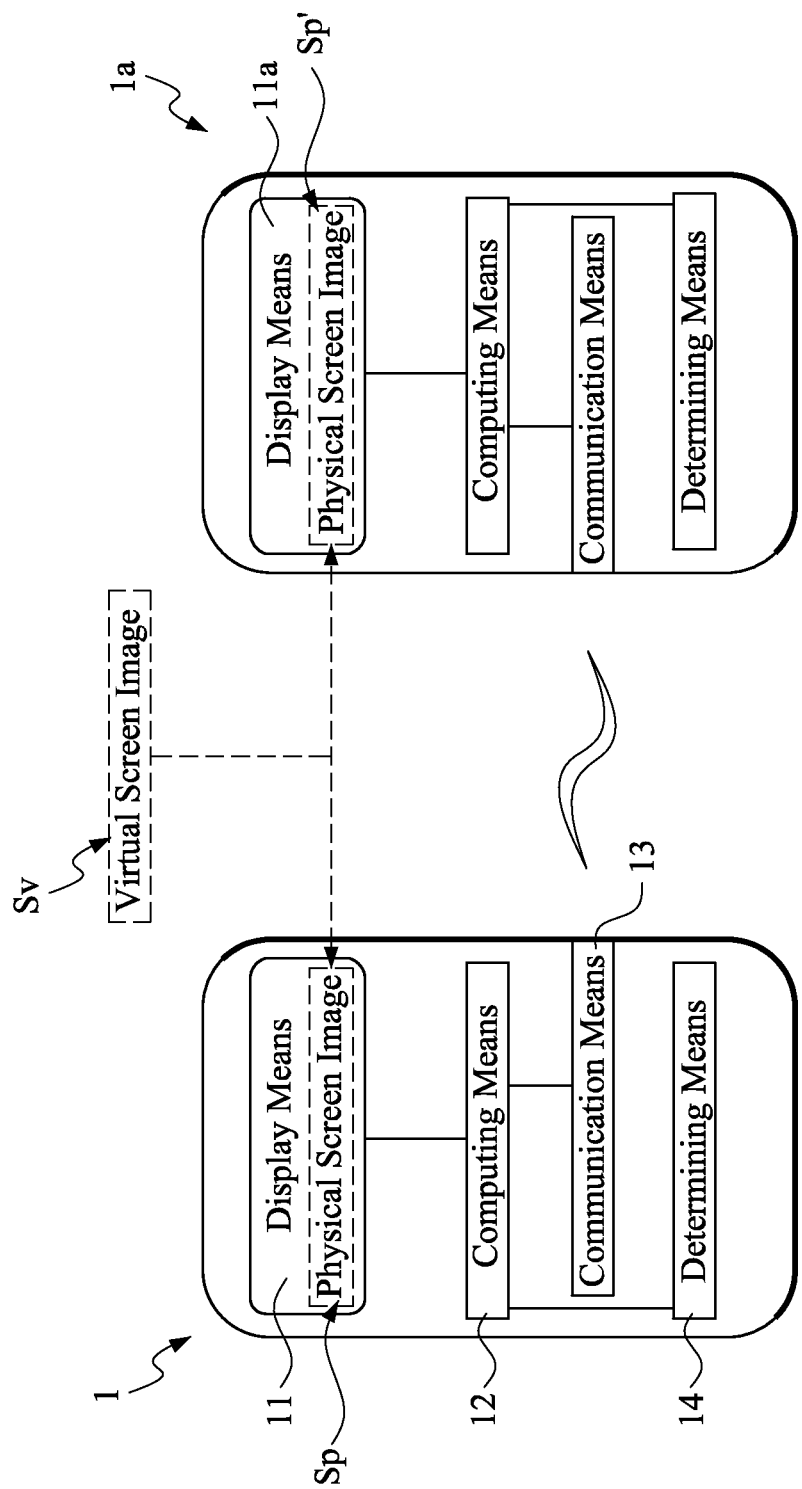
FIG. 2 is a block diagram of interaction mobile displaying devices according to the embodiment of the present invention.

Please refer to FIGS. 1 and 2. FIG. 1 is a schematic drawing of interaction mobile displaying devices according to an embodiment of the present invention, and FIG. 2 is a block diagram of the interaction mobile displaying devices according to the embodiment of the present invention.

As shown in FIGS. 1 and 2, an interaction mobile displaying device 1 according to an embodiment of the present invention is used for sharing one virtual screen image Sv with other interaction mobile displaying devices. The interaction mobile displaying device 1 includes a display means 11, a computing means 12, a communication means 13, and a determining means 14.

The display means 11 can function as a traditional screen, and a screen image displayed thereon is called as a physical screen image Sp in this specification. The "physical" screen image Sp means that the screen image is displayed on a physical apparatus (i.e., the interaction mobile displaying device 1). The physical screen image Sp is corresponding to a portion of the virtual screen image Sv. The virtual screen image Sv will be detailed below.

The computing means 12 is connected with the display means 11, for executing computations of the interaction mobile displaying device 1. In some embodiments, the computing means 12 may be a graphic card, a processor, or the like.

The communication means 13 is connected with the computing means 12, for communicating with other interaction mobile displaying devices to share the virtual screen image Sv. In this embodiment, the interaction mobile displaying device 1 is communicated to another interaction mobile displaying device 1a by the communication means 13 in such a manner to allow the physical screen image Sp of the interaction mobile displaying device 1 to combine with a physical screen image Sp' of interaction mobile displaying device 1a to form as one virtual screen image Sv. As the result, for a user of interaction mobile displaying device 1, he/she seems to have an extra display means 11a to display another physical screen image Sp'. Likewise, for a user of interaction mobile displaying device 1a, he/she becomes to have an additional display means 11. For users, the virtual screen image Sv, which is formed by combining two physical screen image Sp and Sp', is obtained. In other words, it also means that the virtual screen image Sv is a screen image seen by users.

Figure 3:
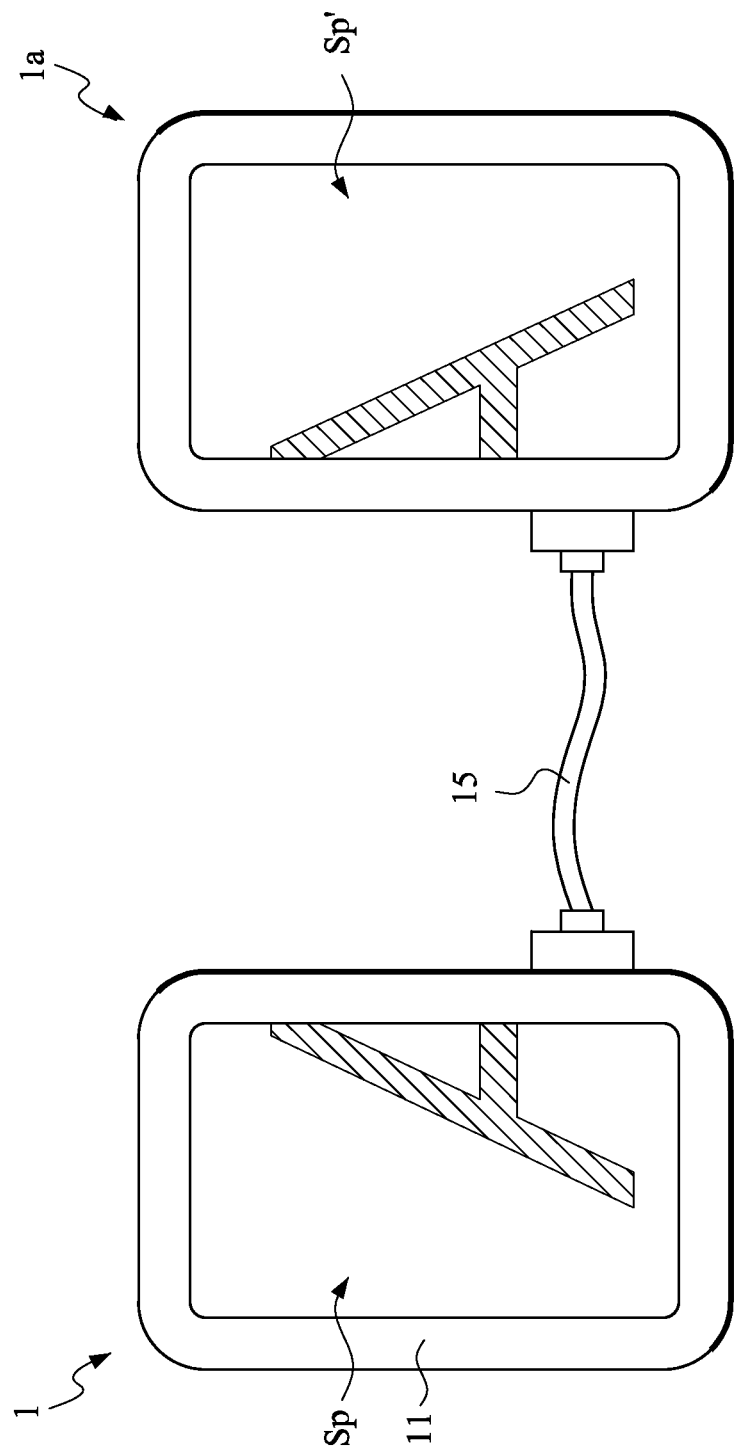
FIG. 3 is a schematic drawing illustrating the interaction mobile displaying devices being in communication via a physical transmission line.
Figure 4:
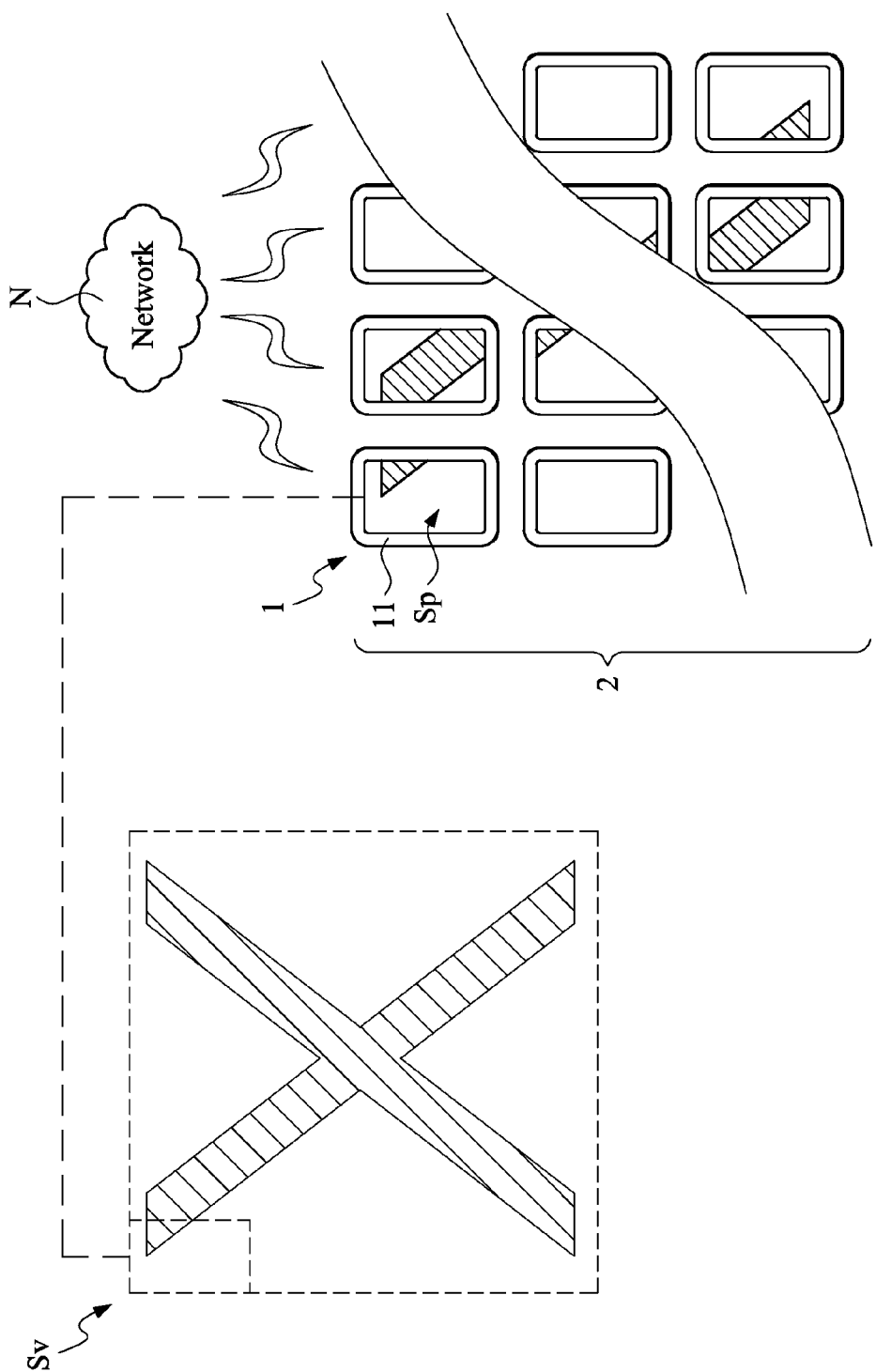
FIG. 4 is a schematic drawing illustrating the interaction mobile displaying devices being in communication through a network.

There are various communicating ways for communication means 13 to perform, such as wireless transmission, physical transmission line, network, and so on. As for the wireless transmission, a communication between the interaction mobile displaying devices can be implemented by an infrared transmission, Bluetooth technology, and the like. As for the physical transmission, a communication between the interaction mobile displaying devices can be implemented by an external physical transmission line 15 (shown in FIG. 3) connected therebetween or contacting of transmission contact points thereof. As for the network, as shown in FIG. 4, a network N such as internet, local area network (LAN), and the like can be used for implementing a communication between the interaction mobile displaying devices. And, those interaction mobile displaying devices in the communication are formed into an interaction mobile displaying device group 2.

Please be noted that there is not to limit the number and distance for the interaction mobile displaying devices in the interaction mobile displaying device group 2. Any interaction mobile displaying device in communication with other interaction mobile displaying devices is regarded as a member of the interaction mobile displaying device group 2 to share one virtual screen image Sv. Preferably, the interaction mobile displaying device 1 is further provided with a determining means 14 connected with the computing means 12, for determining whether sharing the virtual screen image Sv with other interaction mobile displaying devices.

Figure 5:
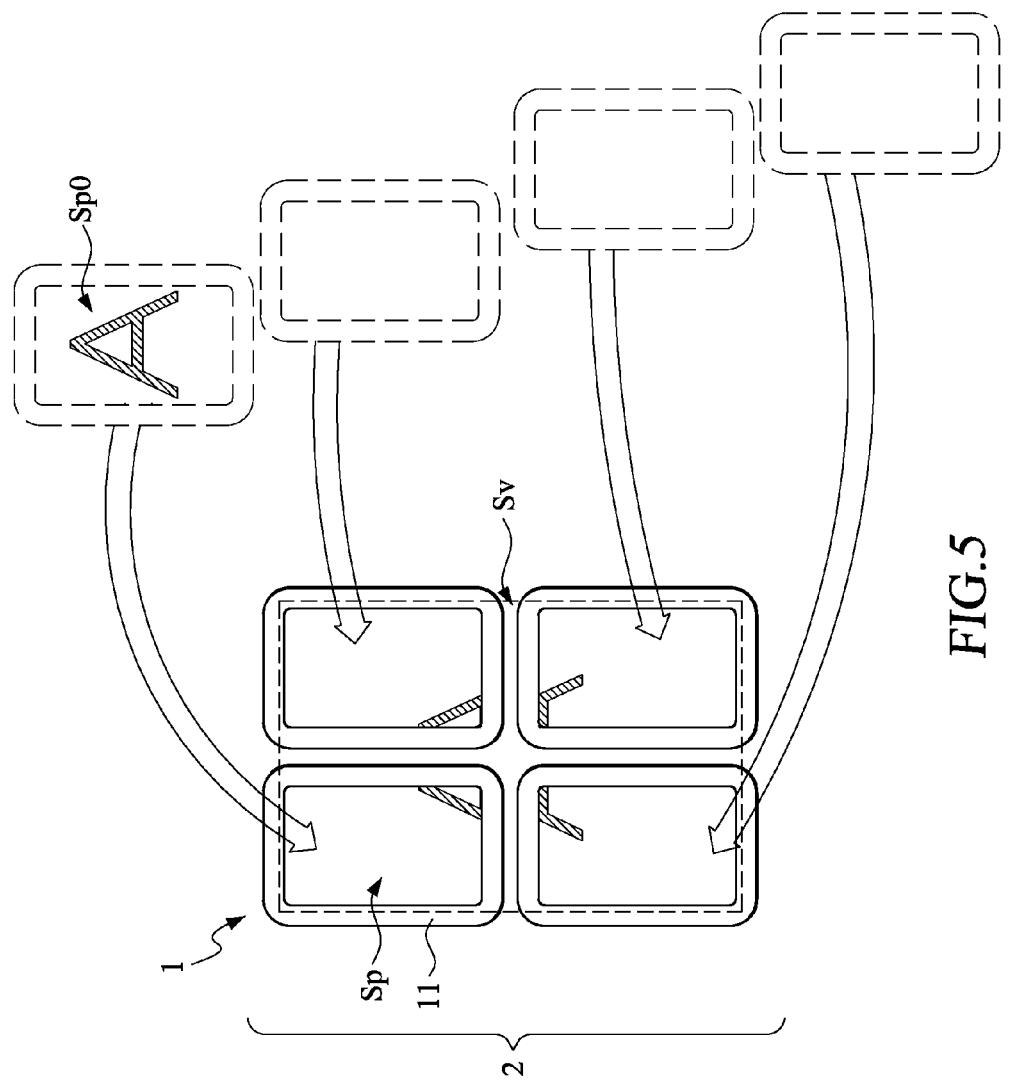
FIG. 5 is a schematic drawing illustrating an interaction mobile displaying device group displaying a virtual screen image sourced from one physical screen image.

The displaying detail of the virtual screen image Sv will be described below. Please refer to FIGS. 5-7. FIG. 5 is a schematic drawing illustrating an interaction mobile displaying device group displaying a virtual screen image sourced from one physical screen image, FIG. 6 is a schematic drawing illustrating an interaction mobile displaying device group displaying a virtual screen image obtained by resizing a physical screen image, and FIG. 7 is a schematic drawing illustrating an interaction mobile displaying device group displaying physical screen image obtained by changing the image resolution of a physical screen image.

As shown in FIG. 5, the virtual screen image Sv is a collection of multiple physical screen image Sp. The virtual screen image Sv may be sourced from a physical screen image Sp0 of one interaction mobile displaying device 1 of the interaction mobile displaying device group 2. In other words, one interaction mobile displaying device 1 selected from the interaction mobile displaying device group 2 is served as a master interaction mobile displaying device and other interaction mobile displaying devices of the interaction mobile displaying device group 2 are served as slave interaction mobile displaying devices. The physical screen image Sp0 of the interaction mobile displaying device 1 served as the master interaction mobile displaying device is provided as a source of the virtual screen image Sv. However, the present invention is not limited to this and the virtual screen image Sv can be sourced the screen image from a network or a peripheral as well as the interaction mobile displaying device in the interaction mobile displaying device group 2.

Figure 6:
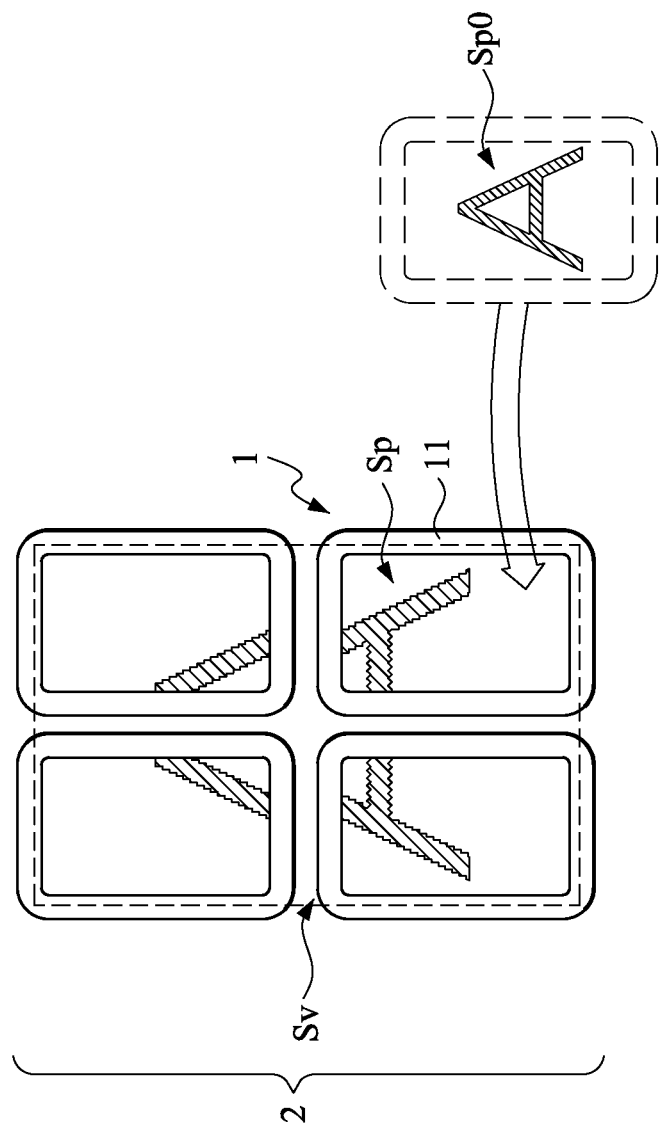
FIG. 6 is a schematic drawing illustrating an interaction mobile displaying device group displaying a virtual screen image obtained by resizing a physical screen image.
Figure 7:
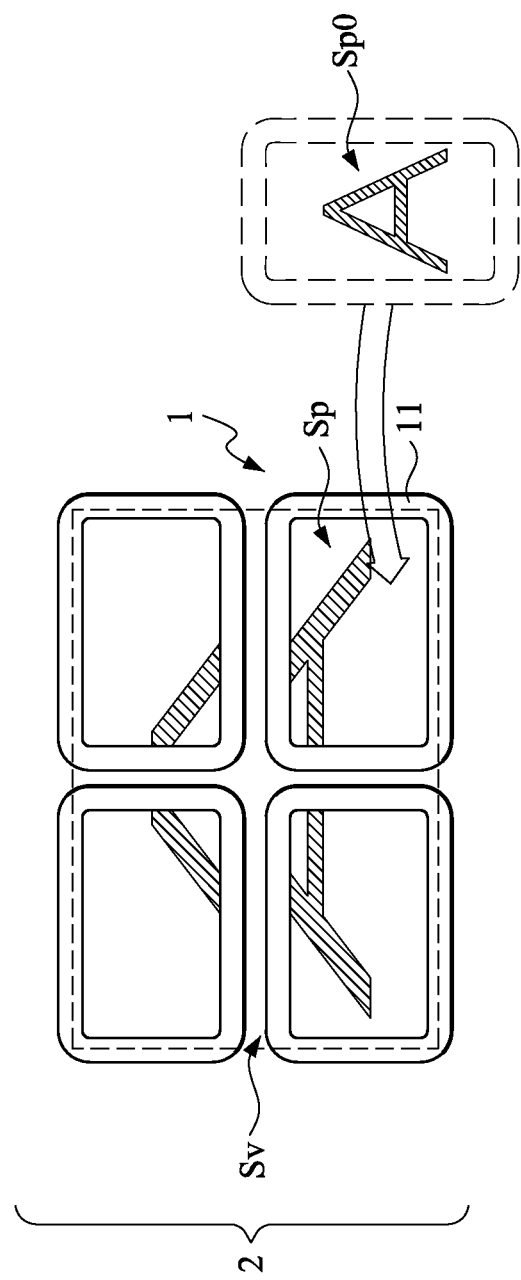
FIG. 7 is a schematic drawing illustrating an interaction mobile displaying device group displaying physical screen image obtained by changing the image resolution of a physical screen image.

Further, the virtual screen image Sv can be obtained by resizing the source physical screen image Sp0, as shown in FIG. 6. Besides that, the virtual screen image Sv also can be obtained by changing the image resolution of the physical screen image Sp0 to get a higher image quality, as shown in FIG. 7.

Note that, for simplicity, most figures of the present invention illustrates the virtual screen image Sv as a complete diagram and every physical screen image Sp thereof is shown as a diagram split from the complete diagram. However the content of the physical screen images Sp of every interaction mobile displaying device of the interaction mobile displaying device group 2 may be independent on each other. For example, the content of the physical screen images Sp can be remained as the same at the time before and after the interaction mobile displaying device 1 shares the virtual screen image Sv. In the case that the physical screen images Sp of every interaction mobile displaying devices of the interaction mobile displaying device group 2 are independent of each other, the virtual screen image Sv is like a large screen image having several sub-screen images.

Further, although the physical screen images Sp of all of the interaction mobile displaying devices of the interaction mobile displaying device group 2 are shown to be corresponding to a portion of the virtual screen image Sv, respectively, it does not mean that the sum of all of the physical screen images Sp is equivalent to the full virtual screen image Sv. For example, FIG. 8 shows that the sum of all physical screen images Sp is not equivalent to the full virtual screen image Sv.

Figure 8:
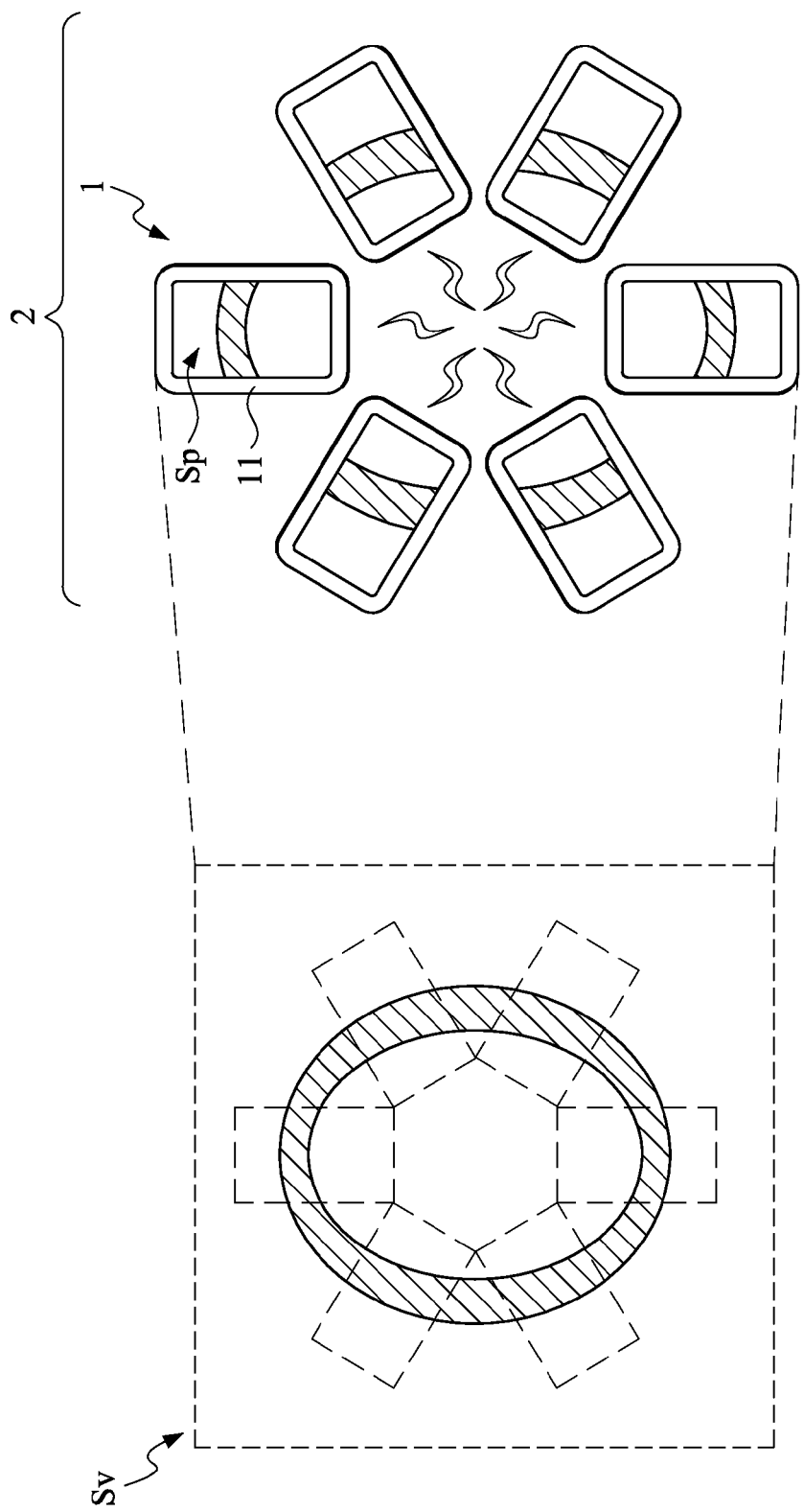
FIG. 8 is a schematic drawing illustrating each interaction mobile displaying device displaying a physical screen image depending on its position in relation to the interaction mobile displaying device group.

FIG. 8 also shows another displaying action of the virtual screen image Sv. In FIG. 8, the portion of the virtual screen image Sv corresponding to the physical screen image Sp is associated with the position of the interaction mobile displaying device 1 in relation to all of the interaction mobile displaying devices sharing the virtual screen image (i.e., all of the displaying devices of the interaction mobile displaying device group 2). The display action of displaying the physical screen image Sp depending on the real spatial relation is more intuitive and convenient for users.

Figure 9:
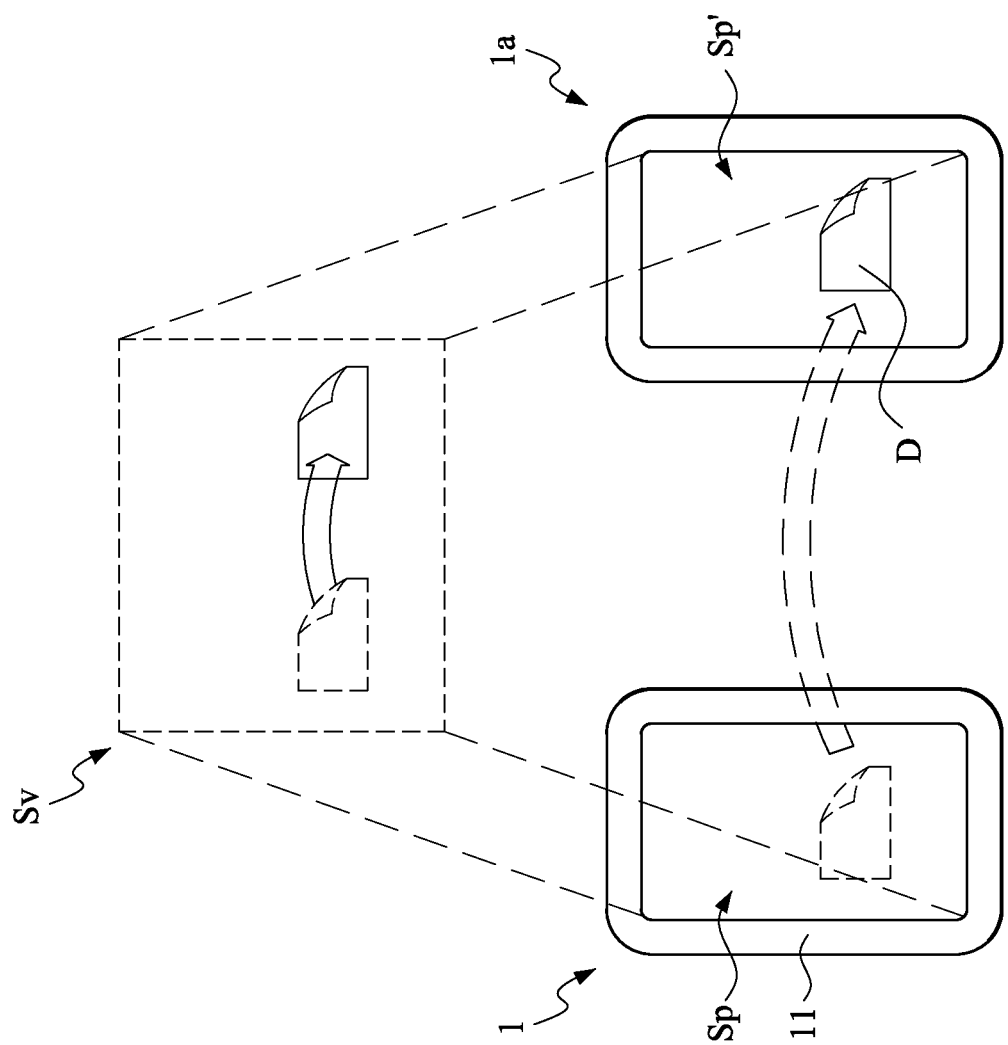
FIG. 9 is a schematic drawing illustrating the interaction mobile displaying devices being data transmittable to each other through the virtual screen image.

Please refer to FIG. 9, which is a schematic drawing illustrating the interaction mobile displaying devices being data transmittable to each other through the virtual screen image. As well as for sharing the screen image, the virtual screen image Sv can be used as a medium for transmitting. Through the virtual screen image Sv, the physical screen image Sp of the interaction mobile displaying device 1 is data transmittable to a physical screen image Sp' of another interaction mobile displaying device 1a. For example, a data D is transmitted from the interaction mobile displaying device 1 to the interaction mobile displaying device 1a while dragging the picture of the data D from left to right in the virtual screen image Sv. Certainly, it usually needs software and hardware support to implement such transmission on the interaction mobile displaying device 1 and 1a.

Figure 10:
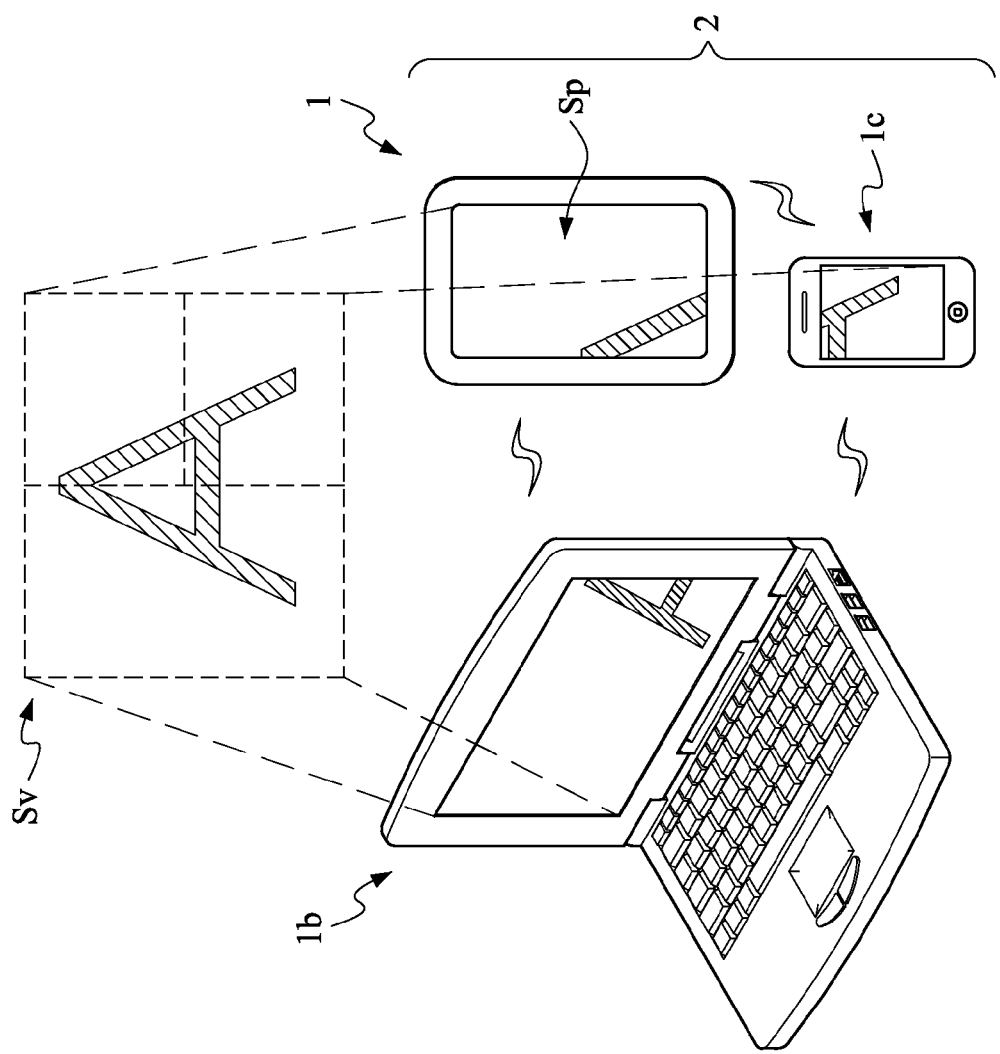
FIG. 10 is a schematic drawing of examples of interaction mobile displaying devices of the present invention.

Please refer to FIG. 10, which is a schematic drawing of examples of-interaction mobile displaying devices of the present invention. There are various types of the interaction mobile displaying devices 1, 1b, and 1c, such as a tablet computer, a notebook computer, a cell phone, and the like, and those interaction mobile displaying devices have a difference in screen size. Even so, the interaction mobile displaying devices 1, 1b, and 1c are capable of communicating with each other. In other words, the device type and screen size are nothing to the interaction mobile displaying devices 1, 1b, and 1c to share one virtual screen image Sv.

From the above, the interaction mobile displaying device of the present invention is capable of communicating with other interaction mobile displaying devices to share one virtual screen image with each other. Thus, with the join of more interaction mobile displaying devices in communication, the physical dimension of screen image is increased. It thus makes the number and dimension of screens larger. It benefits to provide a better service and utilization for sharing interaction mobile displaying devices. Further, the virtual screen image can be served as a platform for communication and transmission. It therefore allows physical screen image of the interaction mobile displaying devices to interact with each other. While the conventional interaction implemented by software is limited by the software itself, the interaction implemented through the virtual screen image can fully achieve the function of the interaction mobile displaying device without any consideration of the software.

As can be appreciated from the above embodiments, the interaction mobile displaying device of the present invention has industry worth which meets the requirement for a patent. The above description should be considered as only the discussion of the preferred embodiments of the present invention. However, a person having ordinary skill in the art may make various modifications to the present invention. Those modifications still fall within the spirit and scope defined by the appended claims.

What is claimed is:

1. An interaction mobile displaying device for jointly displaying one virtual screen image with other interaction mobile displaying devices, wherein the interaction mobile displaying device and other interaction mobile displaying devices are joined as an interaction mobile displaying device group, in which one of the interaction mobile displaying devices in the interaction mobile displaying device group is selected as a master displaying device and each one of all other interaction mobile displaying devices in the interaction mobile displaying device group is selected as a slave displaying device, the interaction mobile displaying device comprising:

display means for displaying a physical screen image corresponding to a portion of the virtual screen image, wherein the virtual screen image is sourced from one of the interaction mobile displaying devices in the interaction mobile displaying device group;

computing means, connected with the display means, for executing computations of the join of the interaction mobile displaying device and/or the join of other interaction mobile displaying devices in the interaction mobile displaying device group so as to obtain the portion of the virtual screen image; and communication means, connected with the computing means, for communicating the interaction between/among the interaction mobile displaying device and the other interaction mobile displaying devices in the interaction mobile displaying device group so as to display interaction mobile displaying device the portion of the virtual screen image.

2. The interaction mobile displaying device as claimed in claim 1, wherein the communication means is communicated with other interaction mobile displaying devices by a wireless transmission method.

3. The interaction mobile displaying device as claimed in claim 1, wherein the communication means is communicated with other interaction mobile displaying devices via a physical transmission line.

4. The interaction mobile displaying device as claimed in claim 1, wherein the communication means is communicated with other interaction mobile displaying devices through a network.

5. The interaction mobile displaying device as claimed in claim 1, wherein the virtual screen image is sourced from the physical screen image selected from one of the interaction mobile displaying device and other interaction mobile displaying devices.

6. The interaction mobile displaying device as claimed in claim 5, wherein the virtual screen image is obtained by resizing the physical screen image.

7. The interaction mobile displaying device as claimed in claim 5, wherein the virtual screen image is obtained by changing the image resolution of the physical screen image.

8. The interaction mobile displaying device as claimed in claim 1, wherein the portion of the virtual screen image corresponding to the physical screen image is associated with the position of the interaction mobile displaying device in relation to all of the interaction mobile displaying devices sharing the virtual screen image.

9. The interaction mobile displaying device as claimed in claim 1, wherein the physical screen image of the interaction mobile displaying device is data transmittable to the physical screen image of other interaction mobile displaying devices through the virtual screen image.

10. The interaction mobile displaying device as claimed in claim 1, further comprising determining means, connected with the computing means, for determining whether sharing the virtual screen image with other interaction mobile displaying devices.

\* \* \* \* \*